(12) United States Patent
Weister et al.

(10) Patent No.: US 7,019,229 B1
(45) Date of Patent: Mar. 28, 2006

(54) DOOR INTERLOCK ASSEMBLY AND DRAW-OUT CIRCUIT BREAKER ASSEMBLY EMPLOYING THE SAME

(75) Inventors: Nathan J. Weister, Darlington, PA (US); Glen C. Sisson, Monaca, PA (US); Mark A. McAfee, Georgetown, PA (US)

(73) Assignee: Eaton Corporation, Cleveland, OH (US)

( * ) Notice: Subject to any disclaimer, the term of this patent is extended or adjusted under 35 U.S.C. 154(b) by 27 days.

(21) Appl. No.: 10/933,939

(22) Filed: Sep. 3, 2004

(51) Int. Cl.
*H01H 9/20* (2006.01)

(52) U.S. Cl. .............................. 200/50.17; 200/50.01; 361/605

(58) Field of Classification Search .. 200/50.17–50.26, 200/50.01; 361/605–609
See application file for complete search history.

(56) References Cited

U.S. PATENT DOCUMENTS

| | | | |
|---|---|---|---|
| 4,002,864 A | 1/1977 | Kuhn et al. | |
| 4,002,865 A | 1/1977 | Kuhn et al. | |
| 4,017,698 A | 4/1977 | Kuhn et al. | |
| 4,190,755 A | 2/1980 | Rogers | |
| 4,728,757 A | 3/1988 | Buxton et al. | |
| 5,278,722 A * | 1/1994 | Peruso | 361/606 |
| 5,290,982 A * | 3/1994 | Beck et al. | 200/401 |
| 5,543,595 A * | 8/1996 | Mader et al. | 200/401 |
| 5,594,610 A | 1/1997 | Robirds et al. | |
| 5,905,244 A | 5/1999 | Smith et al. | |
| 5,963,420 A | 10/1999 | Bailey et al. | |
| 6,031,192 A | 2/2000 | Liebetruth | |
| 6,244,891 B1 * | 6/2001 | Robbins et al. | 439/372 |
| 6,388,214 B1 * | 5/2002 | Jones et al. | 200/50.33 |
| 6,388,868 B1 | 5/2002 | Leccia et al. | |
| 6,437,261 B1 * | 8/2002 | Bryant et al. | 200/43.16 |
| 6,445,570 B1 | 9/2002 | Leccia | |
| 6,545,859 B1 | 4/2003 | Leccia | |
| 6,563,062 B1 | 5/2003 | Kurano et al. | |

* cited by examiner

*Primary Examiner*—Kyung Lee
(74) *Attorney, Agent, or Firm*—Martin J. Moran (57) ABSTRACT

A door interlock assembly is for a draw-out circuit breaker assembly. A draw-out circuit breaker is housed within an enclosure including a door and includes a poleshaft operable between first and second positions corresponding to separable contacts being opened and closed, respectively. The door interlock assembly includes a pivot member coupled to the poleshaft and a door latch interconnected to the pivot member by a linkage, such as a threaded drive rod. The door latch pivots such that a first end thereof engages and locks the door of the enclosure when the poleshaft moves to the second position. An optional mechanical sensor assembly adapted to trip the circuit breaker when the door is positioned in any position other than closed, is also disclosed.

21 Claims, 5 Drawing Sheets

DOOR INTERLOCK ASSEMBLY AND DRAW-OUT CIRCUIT BREAKER ASSEMBLY EMPLOYING THE SAME

BACKGROUND OF THE INVENTION

1. Field of the Invention

The present invention relates generally to electrical switching apparatus and, more particularly, to a draw-out circuit breaker assembly including a door interlock assembly for controlling access to a draw-out circuit breaker housed within an enclosure having a door. The invention also relates to a door interlock assembly.

2. Background Information

Electrical switching apparatus used in power distribution systems are often mounted within a housing assembly either individually or in combination with other switchgear (e.g., without limitation, circuit switching devices and circuit interrupters such as circuit breakers, contactors, motor starters, motor controllers and other load controllers).

Some electrical switching apparatus, for example, low voltage circuit breakers, can be quite large. In order to facilitate movement (e.g., installation; removal; maintenance), a sizeable circuit breaker is commonly coupled to rollers which permit such circuit breaker to be drawn out of the housing assembly. Accordingly, such circuit breakers are commonly known in the art as "draw-out" circuit breakers.

The enclosure which houses the draw-out circuit breaker generally includes side walls, a top, a bottom, a door and the draw-out mechanism. The draw-out mechanism includes, for example, a combination of rails and rollers on one or both of the side walls of the enclosure and the sides of the circuit breaker. See, e.g., U.S. Pat. Nos. 4,002,864; 4,002,865; 4,017,698; 4,728,757; and 6,563,062. The circuit breaker may be further supported within a draw-out frame, commonly known in the art as a cassette or chassis. See, e.g., U.S. Pat. No. 6,031,192.

To prevent injury (e.g., electrical shock), it is often desirable to limit access to energized electrical equipment within the enclosure. For example, in order to provide access and perform maintenance on a draw-out circuit breaker, the circuit breaker must be drawn out of the enclosure. Improper maintenance procedures (e.g., failure to first de-energize or turn the circuit breaker OFF) could cause serious injury to maintenance personnel and damage to the electrical equipment. Accordingly, known prior art draw-out circuit breaker assemblies have incorporated a variety of mechanisms in an attempt to prevent access to electrical components housed within the enclosure until the circuit breaker has been disconnected from the power source. Each of these mechanisms has its own unique set of disadvantages.

For example, U.S. Pat. No. 4,002,865 discloses a draw-out type circuit interrupter with an interlocked mechanism. The circuit interrupter is housed in an enclosure having a door with a window through which to view a position indicator. A levering mechanism operates the draw-out unit between a connected position, wherein the circuit interrupter is fully within the enclosure, and a disconnected position, wherein the circuit interrupter is drawn out of the enclosure. However, the circuit interrupter does not include a mechanism for locking the door of the enclosure. Instead it provides an elaborate, complex barrier and levering mechanism to control movement of the draw-out unit.

U.S. Pat. No. 4,728,757 discloses an interlock assembly for preventing access to the draw-out mechanism of a draw-out circuit breaker which is in the closed (i.e. ON) position. The front cover of the circuit breaker includes a sliding door movable between a first position, wherein access is provided to a driver shaft assembly for operation of the draw-out mechanism, and a second position, wherein such access is prevented. A plunger and slider mechanism is operably associated with the access door to prevent the door from being moved from the second position to the first position unless the contacts within the circuit breaker are open (i.e., the circuit breaker is OFF). However, the interlock mechanism requires numerous complex, separate parts and modification to the enclosure front cover in order to provide the disclosed access door.

U.S. Pat. No. 6,388,868 discloses an automatically operating interlocking assembly requiring an electrical cabinet to be closed before connection of the equipment therein. The interlock is used to control access of the draw-out assembly. Such access involves inserting a tool through an opening in the cabinet door. The interlock includes a spring-biased locking plate which reciprocates between a locked position wherein the locking plate blocks the opening and resists engagement of the draw-out assembly, and an unlocked position wherein the locking plate permits access to and movement of the draw-out assembly. The locking plate is spring-biased towards its locked position. When the cabinet door is closed, a tab on the door engages a slot in the locking plate, thereby pushing the locking plate from its locked position to its unlocked position. Conversely, opening the door causes the locking plate to move, under spring pressure, from its unlocked position to its locked position. Therefore, access to the drive for moving the draw-out assembly is precluded unless the cabinet door is closed.

U.S. Pat. No. 6,445,570 discloses an automatic interlock assembly including a spring-biased brake bar controlling the position of a brake. The brake bar is biased so that it pulls the brake against one of the wheels of the draw-out circuit breaker, thereby preventing movement of the circuit breaker towards the rear, connected (i.e., ON) position. Closing the door pushes the brake bar, pivoting it away from the wheel.

U.S. Pat. No. 6,545,859 discloses another automatically operating interlock assembly for electrical cabinets housing draw-out circuit breakers. The interlock assembly includes a locking bar pivotally secured to a cam at one end and selectively engaging the cabinet's door at the other end. The cam is pivotally secured adjacent to the draw-out assembly and is spring biased in order to hold the locking bar against a locking tab on the door. When the draw-out assembly moves forward, disconnecting the electrical contacts, it contacts the cam rotating the cam so that the locking bar is retracted from the door permitting it to be opened. Similarly, when the draw-out assembly is fully engaged within the cabinet, the cam is permitted to rotate the locking bar back into engagement with the cabinet door.

Operation of each of the foregoing mechanisms relies upon the position of the draw-out circuit breaker with respect to the enclosure. There is a need, therefore, for a door interlock assembly capable of functioning independently from the position of the draw-out circuit breaker with respect to the enclosure in which it is housed.

There is, therefore, room for improvement in draw-out circuit breakers and door locking mechanisms therefor.

SUMMARY OF THE INVENTION

These needs and others are satisfied by the present invention, which is directed to a door interlock assembly for locking the door of an enclosed draw-out circuit breaker when the circuit breaker separable contacts are closed and the circuit breaker is turned ON. The door interlock assembly is coupled to the poleshaft of the circuit breaker and converts the rotational movement of the circuit breaker poleshaft from a first direction when the circuit breaker is turned ON, to a second position when the circuit breaker is turned OFF, into a corresponding movement at the door latch causing it to engage and lock or disengage and unlock the door, respectively.

As one aspect of the invention, a door interlock assembly is for an enclosure housing electrical switching apparatus. The enclosure includes a frame having first and second sides for supporting the electrical switching apparatus and a door for controlling access to the electrical switching apparatus housed therein. The electrical switching apparatus includes a pair of separable contacts and an operating mechanism for opening and closing the pair of separable contacts. The operating mechanism includes a poleshaft operable between first and second positions corresponding to the pair of separable contacts being closed and opened, respectively. The door interlock assembly comprises: a pivot member structured to be coupled to the poleshaft in order to move therewith, the pivot member including a first end and a second end; a mounting bracket structured to be coupled to one of the first and second sides of the frame, the mounting bracket having an opening receiving a portion of the pivot member therethrough; a door latch structured to be pivotally coupled to the one of the first and second sides of the frame, the door latch including first and second ends, the first end of the door latch being adapted to engage and lock the door of the enclosure; and a linkage interconnecting the pivot member and the door latch.

The pivot member may further include a drive coupler which couples the pivot member to the poleshaft. The door latch may have locked and unlocked positions corresponding to the first and second positions, respectively, of the poleshaft and the drive coupler and the pivot member coupled thereto. Accordingly, the first end of the door latch may be adapted to engage and lock the door of the enclosure when the door latch is disposed in the locked position and to disengage and unlock the door of the enclosure when the door latch is pivoted from the locked position to the unlocked position.

As another aspect of the invention, a door interlock assembly for an enclosure housing the electrical switching apparatus comprises: a pivot member structured to be coupled to the poleshaft in order to move therewith, the pivot member including a first end and a second end; a mounting bracket structured to be coupled to one of the first and second sides of the frame, the mounting bracket having an opening receiving a portion of the pivot member therethrough; a door latch structured to be pivotally coupled to the one of the first and second sides of the frame, the door latch including first and second ends, the first end of the door latch being adapted to engage and lock the door of the enclosure; a linkage interconnecting the pivot member and the door latch; and a mechanical sensor assembly comprising: a trip lever engagement mechanism pivotally coupled to the mounting bracket and adapted to engage and actuate the trip lever, thereby opening the pair of separable contacts when the door of the enclosure is open; a door sensor structured to engage the door, the door sensor having a first position wherein the door is open and a second position wherein the door is closed; and a shaft interconnecting the door sensor and the trip lever engagement mechanism in order that the trip lever engagement mechanism engages and actuates the trip lever, thereby opening the separable contacts when the door sensor is disposed in the first position and the door is open and the trip lever is disengaged, in order to permit the separable contacts to be closed when the door sensor is disposed in the second position and the door is closed.

As a further aspect of the invention, a draw-out circuit breaker assembly comprises: a draw-out circuit breaker including a pair of separable contacts and an operating mechanism for opening and closing the pair of separable contacts, the operating mechanism including a poleshaft, the poleshaft operable between first and second positions corresponding to the pair of separable contacts being open and closed, respectively; an enclosure housing the draw-out circuit breaker, the enclosure including a door for controlling access to the draw-out circuit breaker housed therein, a frame having first and second sides for supporting the circuit breaker and a draw-out mechanism coupled to the frame in order to permit the circuit breaker to be drawn into and out of the enclosure; and a door interlock assembly comprising: a pivot member structured to be coupled to the poleshaft in order to move therewith, the pivot member including a first end and a second end, a mounting bracket structured to be coupled to one of the first and second sides of the frame, the mounting bracket having an opening receiving a portion of the pivot member therethrough, a door latch structured to be pivotally coupled to the one of the first and second sides of the frame, the door latch including first and second ends, the first end of the door latch being adapted to engage and lock the door of the enclosure, and a linkage interconnecting the pivot member and the door latch.

The draw-out circuit breaker may further include a trip lever adapted to open the pair of separable contacts when actuated and a mechanical sensor assembly comprising: a trip lever engagement mechanism pivotally coupled to the mounting bracket and structured to engage and actuate the trip lever thereby opening the pair of separable contacts when the door of the enclosure is open; a door sensor engaging the door, the door sensor having a first position wherein the door is open and a second position wherein the door is closed; and a shaft interconnecting the door sensor and the trip lever engagement mechanism in order that the trip lever engagement mechanism engages and actuates the trip lever, thereby opening the separable contacts when the door sensor is disposed in the first position and the door is open and the trip lever is disengaged thus permitting the separable contacts to be closed when the door sensor is disposed in the second position and the door is closed.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

For purposes of illustration, the invention will be described as applied to draw-out circuit breakers, although it will become apparent that it could also be applied to other types of electrical switching apparatus (e.g., without limitation, circuit switching devices and other circuit interrupters such as contactors, motor starters, motor controllers and other load controllers) which are mounted within an enclosure having a door.

Directional phrases used herein, such as, for example, left, right, clockwise, counterclockwise and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the term "draw-out circuit breaker" refers to a circuit breaker that may be drawn into and out of an enclosure (e.g., without limitation, switchgear cabinet) in which it is housed. A draw-out mechanism (e.g., without limitation, rollers; rails having linear bearings) facilitates the movement of the draw-out circuit breaker into and out of the enclosure.

As employed herein, the statement that two or more parts are "coupled" together shall mean that the parts are joined together either directly or joined through one or more intermediate parts.

As employed herein, the term "number" shall mean one or more than one (i.e., a plurality).

As employed herein, the term "linkage" refers to any known or suitable mechanism for interconnecting one component to another in order to provide mechanical communication therebetween. For example, as discussed herein, the exemplary linkage of the present invention is a threaded rod interconnecting the first end of a pivot member to the second end of a door latch. However, it will be appreciated that any suitable linkage (e.g., without limitation, a wire; a chain; a number of interconnected links) could alternatively be employed.

Figure 1:
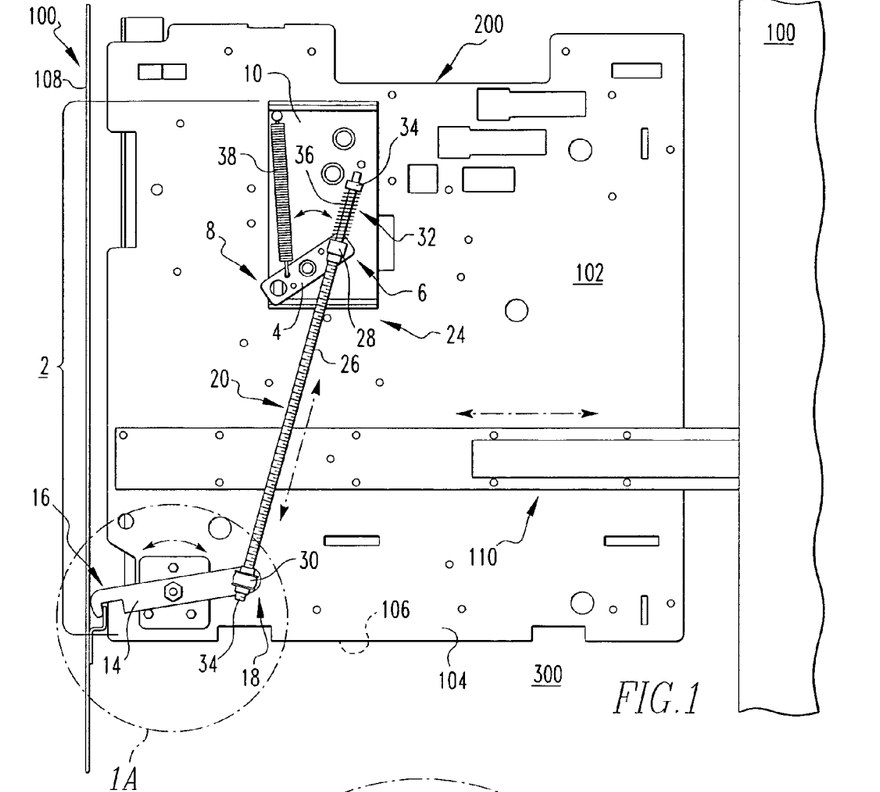
FIG. 1 is a vertical elevational view of a door interlock assembly mounted on a frame supporting a draw-out circuit breaker in accordance with the present invention.
Figure 2:
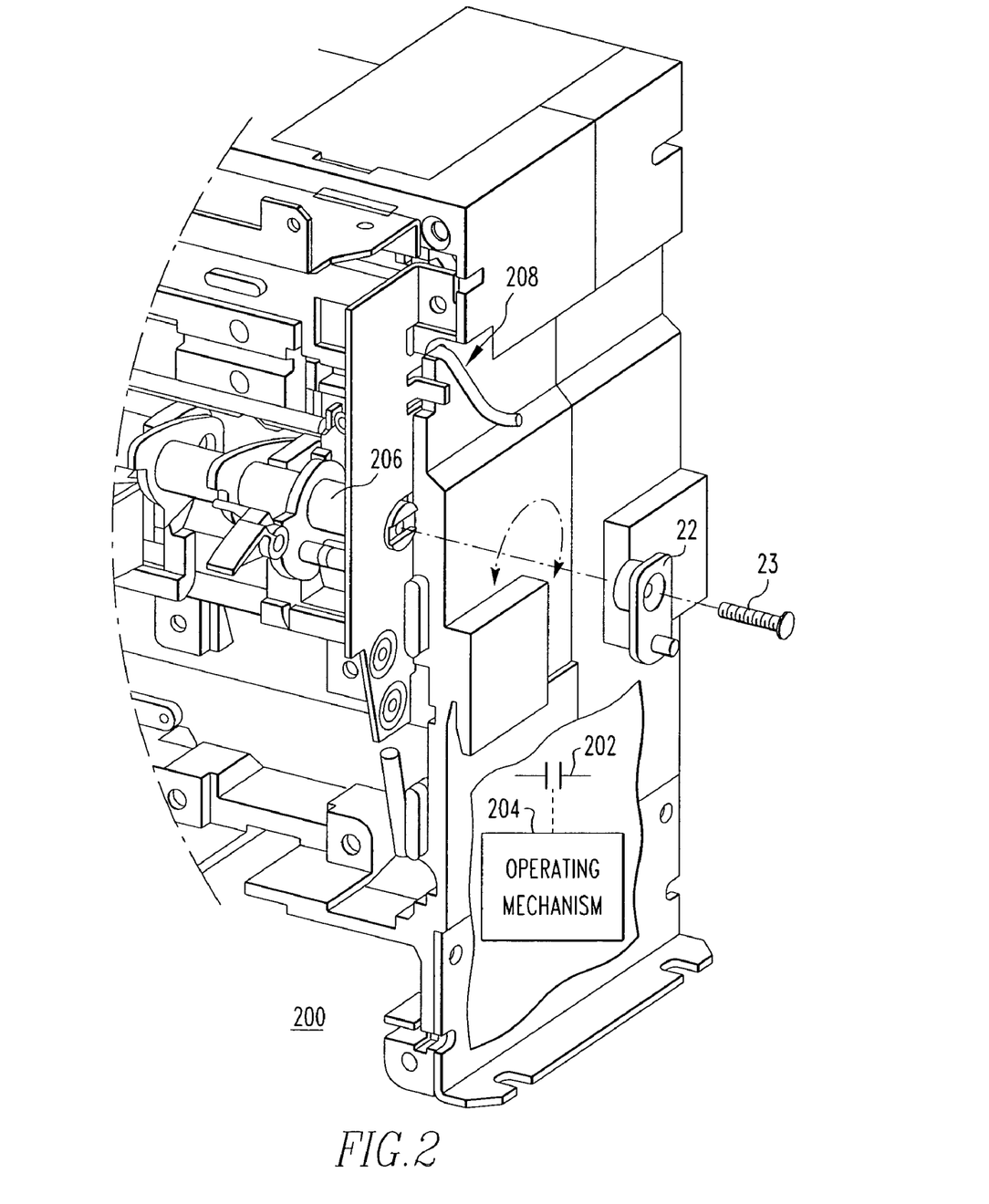
FIG. 2 is an exploded, isometric view of the circuit breaker poleshaft and a drive coupler coupled thereto in accordance with an embodiment of the present invention, with the cover of the circuit breaker removed to show internal structures.

FIG. 1 shows a draw-out circuit breaker assembly 300 including a door interlock assembly 2. The door interlock assembly 2 is for use with an enclosure 100 (e.g., without limitation, a switch gear cabinet), which houses electrical switching apparatus. The exemplary electrical switching apparatus is a draw-out circuit breaker 200 which is supported in a frame or chassis 102 that is coupled to the enclosure 100 by a draw-out mechanism 110. As previously discussed, the draw-out mechanism 110 permits the circuit breaker 200 to be drawn into and out of the enclosure 100 (the drawn-out position is shown in FIG. 1). The frame 102 has first and second sides 104, 106 and a door 108 for controlling access to the circuit breaker 200 housed therein. The circuit breaker 200 includes one or more pairs of separable contacts 202 (one pair is shown in FIG. 2) and an operating mechanism 204 (FIG. 2) for opening and closing the separable contacts 202. The operating mechanism 204 includes a poleshaft 206 (best shown in FIG. 2) which is operable between first and second positions corresponding to the separable contacts 202 being closed and open, respectively. The exemplary draw-out circuit breaker 200 further includes a trip lever 208 (FIG. 2), which will be discussed in further detail herein.

Figure 1A:
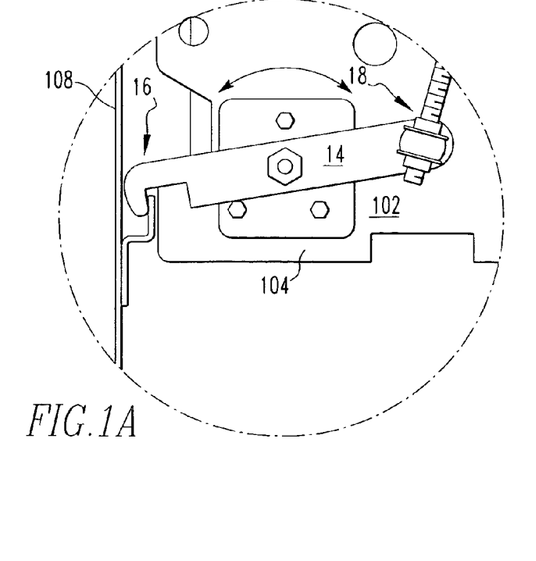
FIG. 1A is an enlarged detail view of the door latch for the door interlock assembly of FIG. 1, with the door latch shown engaging and locking the enclosure door.
Figure 3:
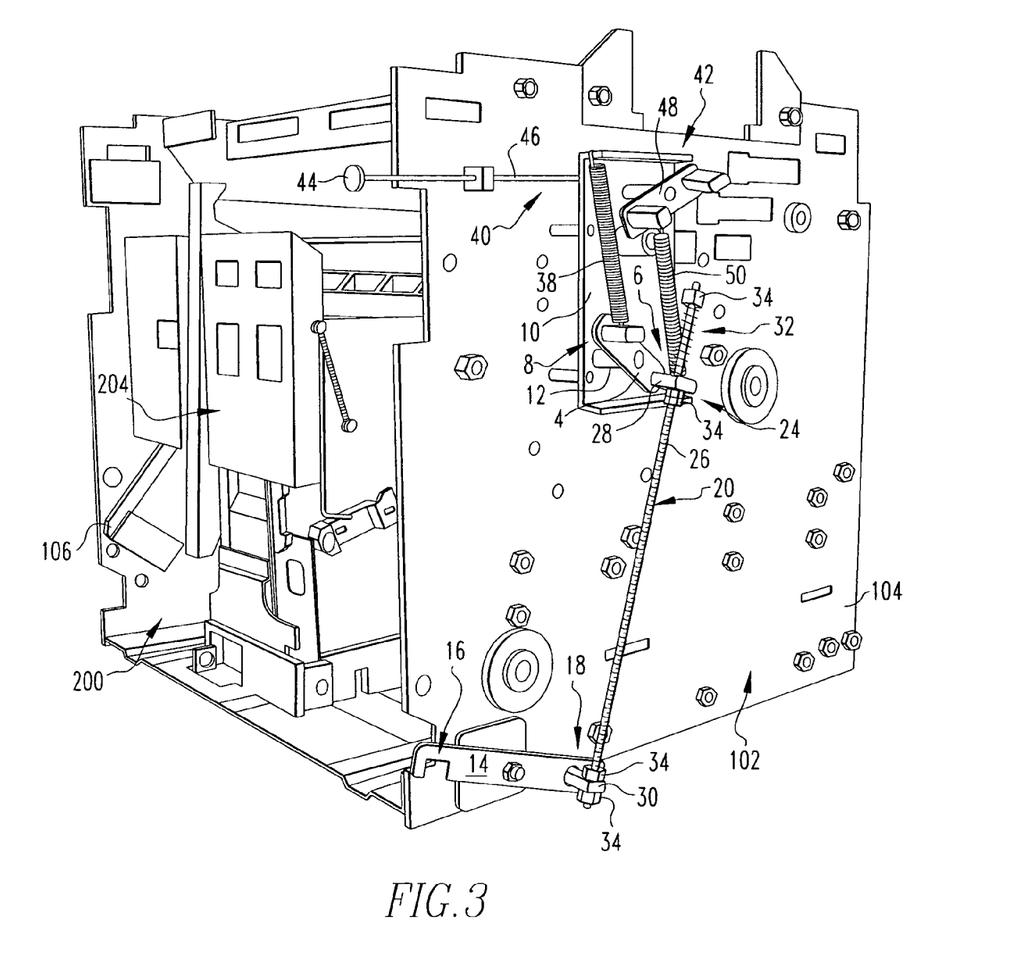
FIG. 3 is an isometric view of the door interlock assembly and a mechanical door sensor in accordance with another embodiment of the invention, with the front cover of the circuit breaker and the enclosure door removed.

The door interlock assembly 2 includes a pivot member 4 and a mounting bracket 10. The pivot member 4 is structured to be coupled to the poleshaft 206 (FIG. 2) in order to move therewith. The mounting bracket 10 is structured to be coupled to one (e.g., side 104) of the first and second sides 104, 106 of the frame 102 and includes an opening 12 (FIG. 3) for receiving a portion of the pivot member 4 therethrough. The pivot member 4 includes a first end 6 and a second 8. A linkage 20 interconnects the pivot member 4 and a door latch 14. The door latch 14 includes first and second ends 16, 18 and is pivotally coupled to the same one (e.g., 104) of the first and second sides 104, 106 of the frame 102 as the mounting bracket 10. As best shown in FIG. 1A, the first end 16 of the door latch 14 is adapted to engage and lock the door 108 of the enclosure 100. Specifically, the door latch 14 has locked and unlocked positions corresponding to the first and second positions, respectively, of the poleshaft 206 (FIG. 2) and the pivot member 4 coupled thereto. The first end 16 of the door latch 14 engages and locks the door 108 of the enclosure 100 when the door latch 14 is disposed in the locked position (as shown in FIG. 1A) and disengages and unlocks the door 108 when the door latch 14 is pivoted from the locked position to the unlocked position (FIG. 3).

As shown, the first end 6 of the pivot member 4 is interconnected with the second end 18 of the door latch 14 by linkage 20. The exemplary linkage 20 is a drive rod assembly 24 including a threaded drive rod 26, first and second pivotal couplings 28, 30 and an adjustable fastening mechanism 32. The drive rod 26 is secured at one end to the first end 6 of the pivot member 4 by the first pivotal coupling 28 and at the other end to the second end 18 of the door latch 14 by second pivotal coupling 30. The exemplary adjustable fastening mechanism 32 includes a plurality of fasteners, such as lock nuts 34, for securing the ends of the threaded drive rod 26 to the pivot member 4 and the door latch 14, respectively. The adjustable fastening mechanism 32 preferably further includes a spring 36 adapted to bias the door latch 14 toward the locked position, as shown in FIGS. 1 and 1A.

Figure 4:
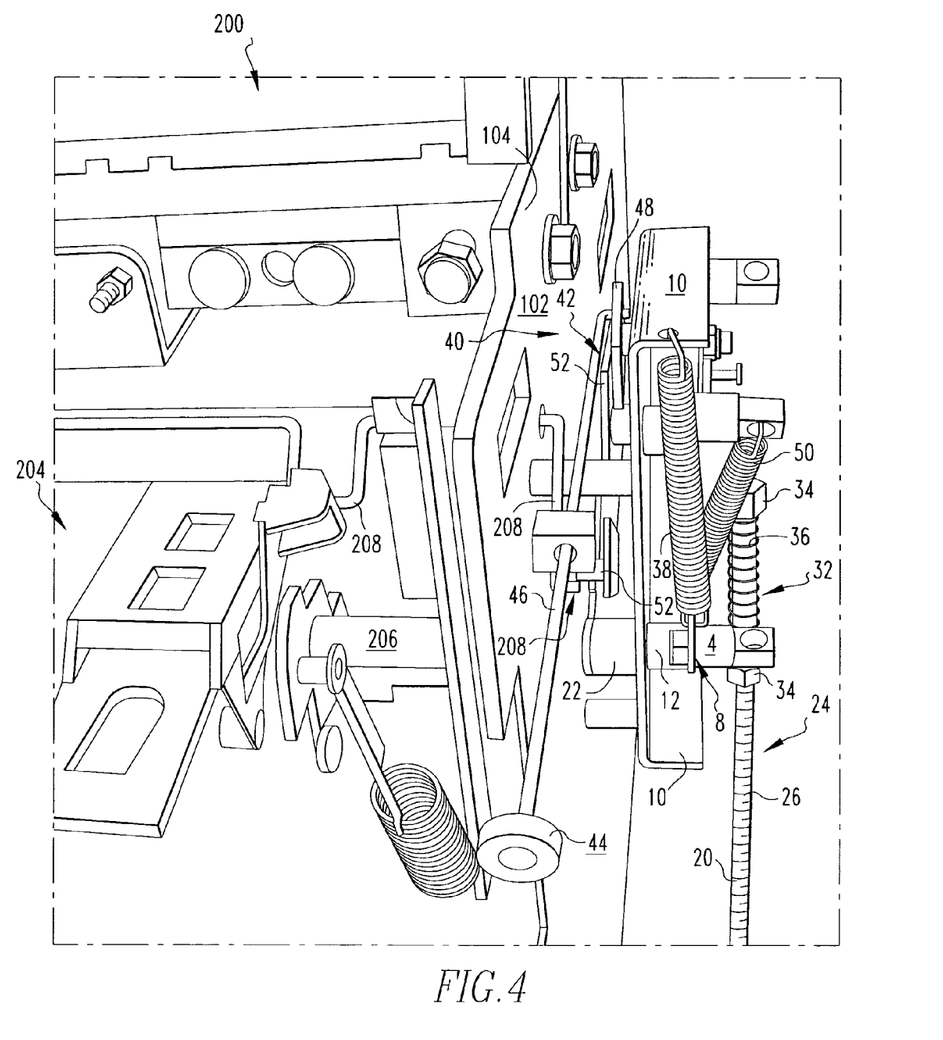
FIG. 4 is an isometric view of the mounting bracket for the door interlock and mechanical door assemblies of FIG. 3.

FIG. 2 illustrates certain structures of the circuit breaker 200 including the poleshaft 206 and the trip lever 208, previously discussed. The exemplary door interlock assembly 2 (FIG. 1) includes a drive coupler 22 coupled to the poleshaft 206 by a fastener, such as the exemplary screw 23, in order to move therewith. As shown in FIGS. 3 and 4, the pivot member 4 is then coupled to the exemplary drive coupler 22 by another fastener 34, in order that it moves with both the drive coupler 22 and the poleshaft 206. It will, however, be appreciated that, as previously discussed, the pivot member 4 could alternatively attach directly to the poleshaft 206 by way of an integral extension (not shown) thereby not requiring the exemplary drive coupler 22.

As previously discussed, the door latch 14 has locked (FIGS. 1 and 1A) and unlocked (FIG. 3) positions corresponding to the first and second positions, respectively, of the poleshaft 206 and the drive coupler 22 and pivot member 4 coupled thereto. The door latch 14 is disposed in the locked position (FIGS. 1 and 1A) when the circuit breaker is ON with poleshaft 206 and the drive coupler 22 and pivot member 4 coupled thereto being disposed in the first position and the separable contacts 202 (FIG. 2) being closed. The door latch 14 is disposed in the unlocked position, as shown in FIG. 3, only when the circuit breaker is turned OFF which causes the poleshaft 206 and the drive coupler 22 and the pivot member 4 coupled thereto to pivot to the second position wherein the separable contacts 202 (FIG. 2) are open.

Referring now to FIGS. 3 and 4, the exemplary mounting bracket 10 includes a spring 38 coupled between the mounting bracket 10 and the second end 8 of the pivot member 4 in order to bias the pivot member 4 and facilitate movement of the door latch 14. The spring 38 assists movement of the latch 14 when the poleshaft 206 and the drive coupler 22 and pivot member 4 coupled thereto, move. Accordingly, the exemplary door interlock assembly 2 is spring-loaded, with the exemplary spring 38 facilitating movement of the second end 8 of the pivot member 4, thereby moving the threaded drive rod 26 and the second 18 of the door latch 14, which are coupled thereto. In this manner, operation of the exemplary door latch 14 safety feature is mechanically linked directly to the operating mechanism 204 of the circuit breaker 200.

FIGS. 3–6 illustrate an optional mechanical sensor assembly 40 for the draw-out circuit breaker assembly 300 (FIG. 1). The mechanical sensor assembly 40 may operate independently or in conjunction with the exemplary door latch 14. The exemplary mechanical sensor assembly 40 includes a trip lever engagement mechanism 42 pivotally coupled to the mounting bracket 10 and adapted to pivot, thereby engaging and actuating the trip lever 208 (FIGS. 2 and 4) of the circuit breaker 200, causing it to rotate thus opening the separable contacts 202 (FIG. 2) when the door 108 (FIG. 5) of the enclosure 100 (FIG. 1) is open. The mechanical sensor assembly 40 further includes a door sensor 44 structured to engage the door 108 and move from a first position, when the door 108 is open, to a second position, when the door 108 is closed. A shaft 46 interconnects the door sensor 44 and the trip lever engagement mechanism 42.

Figure 5:
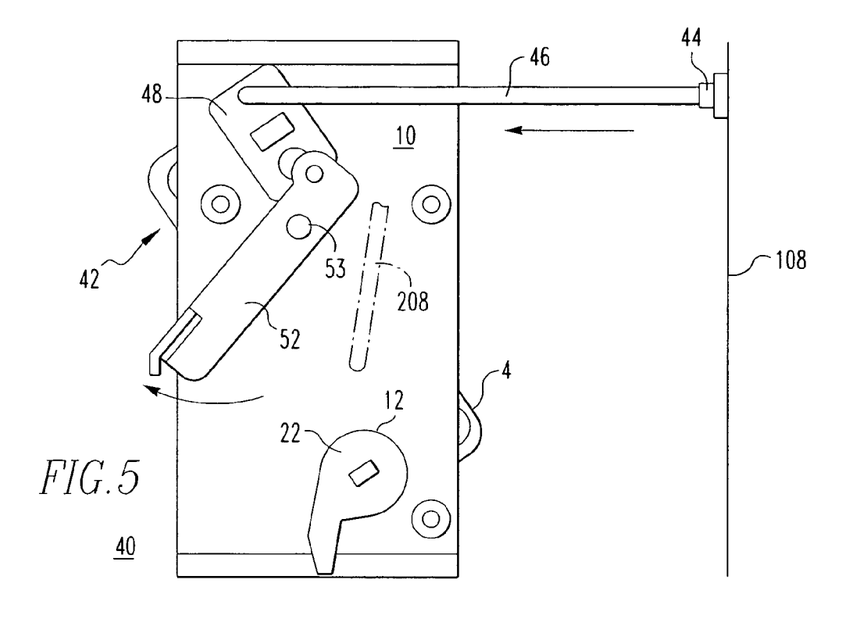
FIG. 5 is a vertical elevational view of the back of the mounting bracket of FIG. 4 and the portion of the mechanical door sensor coupled thereto shown as positioned when the enclosure door is closed, with the circuit breaker trip lever shown in phantom line drawing.

In operation, the trip lever engagement mechanism 42 pivots to engage and rotate the trip lever 208, thereby opening the separable contacts 202 when the door sensor 44 is disposed in the first position and the door 108 is open. Conversely, the trip lever 208 is disengaged, in order to permit the separable contacts 202 to be closed when the door sensor 44 is disposed in the second position and the door 108 is closed. The exemplary trip lever engagement mechanism 42 further includes a second pivot member 48 pivotally coupled to the mounting bracket 10 above the first pivot member 4. A spring 50 is coupled between the second pivot member 48 and the mounting bracket 10 (best shown in FIG. 3). The second pivot member 48 is coupled to the door sensor 44 and a paddle member 52 is coupled to the second pivot member 48. The spring 50 biases the second pivot member 48 and the shaft 46 and door sensor 44 coupled thereto, against the door 108 (FIG. 5). Therefore, movement of the spring-biased second pivot member 48, which is caused by the opening and closing of the door 108, moves the paddle member 52 coupled thereto. In this manner, the paddle member 52 pivots to engage and actuate the trip lever 208 thereby tripping open the separable contacts 202 (FIG. 2) and preventing the circuit breaker 200 from closing when the door 108 of the enclosure 100 is opened.

Figure 6:
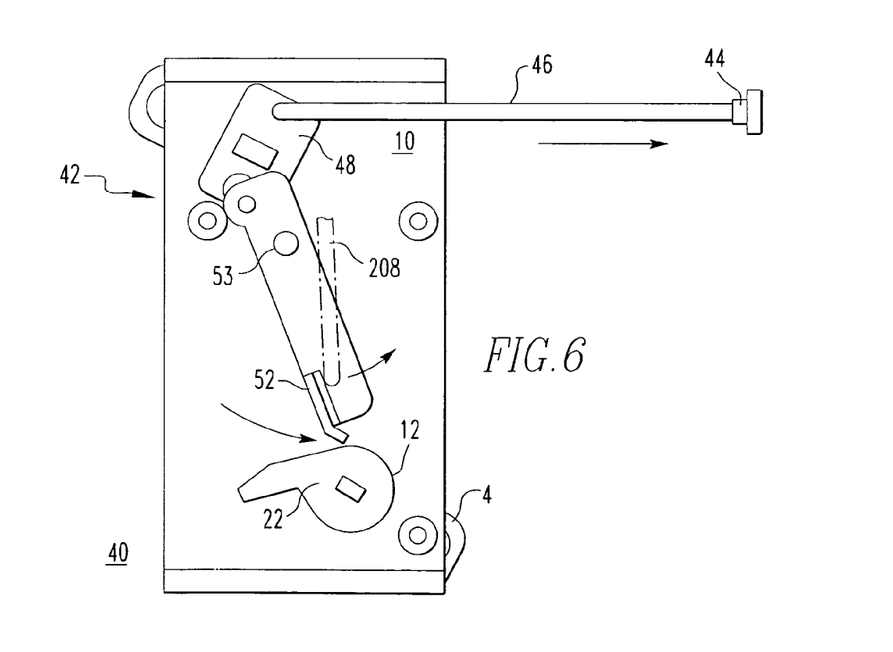
FIG. 6 is a vertical elevational view of the back of the mounting bracket of FIG. 4 and the portion of the mechanical door sensor coupled thereto shown as positioned when the enclosure door is open, with the circuit breaker trip lever shown in phantom line drawing.

FIGS. 5 and 6 show the back of the exemplary mounting bracket 10 and the position of the mechanical sensor assembly 40 coupled thereto when the enclosure door 108 (FIG. 5) is closed and opened, respectively. As shown in FIG. 5, when the door 108 is closed, it applies a force to the door sensor 44 as previously discussed. This in turn moves shaft 46 and the second pivot member 48 coupled thereto to the left, which causes the paddle member 52 to pivot clockwise about pivot 53 away from the trip lever 208 thus permitting the separable contacts 202 (FIG. 2) to be closed and the circuit breaker to be ON. Conversely, as shown in FIG. 6, when the door 108 (not shown in FIG. 6) is opened, the shaft 46 and spring-biased second pivot member 48 coupled thereto move to the right as pressure applied to the shaft 46 by the door 108 (FIG. 5) is relaxed. This causes the exemplary paddle member 52 to pivot counter-clockwise about pivot 53 as shown, thereby engaging and rotating the circuit breaker trip lever 208 counter-clockwise and opening the separable contacts 202 (FIG. 2). It will be appreciated that the mechanical sensor assembly 40 discussed and illustrated herein is only one example of the possible configuration and operation of such an assembly. Alternative embodiments and components could be employed. For example, the door sensor 44 may further include a door catch or shock absorber (not shown). The shock absorber (not shown) could, for example, be structured similar to the spring mechanism of a push button writing pen, to include a spring which compresses in order to dampen the impact of a door 108 when it closes. Such a mechanism would resist, for example, inadvertently actuating the trip lever 208, thus accidentally tripping open the circuit breaker 200 despite the door 108 being closed.

In summary, the exemplary door interlock assembly 2 functions to convert the rotational motion of the poleshaft 206 of the circuit breaker 200 into a linear motion in order to move the exemplary threaded drive rod 26 which in turn pivots the door latch 14. Specifically, the poleshaft 206 rotates in one direction when the circuit breaker is turned ON and the separable contacts 202 are closed and rotates in the opposite direction when the circuit breaker 200 is turned OFF and the separable contacts 202 are open. Additionally, the door interlock assembly 2 may optionally include a second safety mechanism such as the exemplary mechanical door sensor assembly 40, shown in FIGS. 3–6. The mechanical door sensor assembly 40 operates to trip the circuit breaker 200 by activating the trip lever 208 when the enclosure door 108 is in any position other than closed. Accordingly, the exemplary mechanical door sensor assembly 40 provides additional safety by making it difficult for an individual to override the safety features of the door latch 14 by, for example, turning the circuit breaker ON once the door 108 is opened. In operation, the exemplary door interlock assembly 2 only permits the circuit breaker 200 to be ON when the door 108 is closed and locked. In order to open the door 108, the circuit breaker 200 must be turned OFF thus rotating the poleshaft 206 and pivoting the interconnected door latch 14 to unlock the door 108. Additionally, in instances where the optional mechanical door sensor assembly 40 is employed, the spring-biased door sensor 44 senses when the door 108 is open, causing the second pivot member 48 and paddle member 52 to pivot and actuate the circuit breaker trip lever 208, thereby tripping the circuit breaker 200 (i.e. opening the separable contacts 202). Conversely, when the door 108 is closed, it applies a force to the door sensor 44 and shaft 46 coupled thereto which pivots the second pivot member 48 and paddle member 52 away from the trip lever 208 thereby permitting the circuit breaker 200 to be turned ON.

Accordingly, the door interlock assembly 2, optional mechanical sensor assembly 40 and draw-out circuit breaker assembly 300 employing the same, of the present invention, provide improved safety when compared with the prior art. The door interlock assembly 2 through its direct interconnection with the circuit breaker poleshaft 206 locks and unlocks the door 108 based upon the operating status of the circuit breaker 200 (i.e., ON or OFF) in order to prevent access to the circuit breaker 200 when it is energized. This is faster and more reliable rather than controlling access based upon the position of the draw-out circuit breaker 200 in relation to the enclosure 100. The optional mechanical door sensor mechanism 40 adds redundancy further improving safety using a separate safety device which trips the circuit breaker 200 when the enclosure door 108 is in any position other than closed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A door interlock assembly for an enclosure housing electrical switching apparatus, said enclosure including a frame having first and second sides for supporting said electrical switching apparatus and a door for controlling access to said electrical switching apparatus housed therein, said electrical switching apparatus including a pair of separable contacts and an operating mechanism for opening and closing said separable contacts, said operating mechanism including a poleshaft operable between first and second positions corresponding to said separable contacts being closed and opened, respectively, said door interlock assembly comprising:
   a pivot member structured to be coupled to said poleshaft in order to move therewith, said pivot member including a first end and a second end;
   a mounting bracket structured to be coupled to one of said first and second sides of said frame, said mounting bracket having an opening receiving a portion of said pivot member therethrough;
   a door latch structured to be pivotally coupled to said one of said first and second sides of said frame, said door latch including first and second ends, the first end of said door latch being adapted to engage and lock the door of said enclosure; and
   a linkage interconnecting said pivot member and said door latch.

2. The door interlock assembly of claim 1 wherein said pivot member further includes a drive coupler structured to be coupled to said poleshaft, in order to move therewith; and wherein said pivot member is coupled to said drive coupler, in order that it moves with said drive coupler and said poleshaft.

3. The door interlock assembly of claim 2 wherein said door latch has locked and unlocked positions corresponding to said first and second positions, respectively, of said poleshaft and said drive coupler and said pivot member coupled thereto; wherein the first end of said door latch is adapted to engage and lock the door of said enclosure when said door latch is disposed in said locked position; and wherein the first end of said door latch is adapted to disengage and unlock the door of said enclosure when said door latch is pivoted from said locked position to said unlocked position.

4. The door interlock assembly of claim 3 wherein said linkage interconnecting said pivot member and said door latch includes a drive rod coupled at one end to the first end of said pivot member and at the other end to the second end of said door latch; wherein said door latch is disposed in said locked position when said poleshaft and said drive coupler and said pivot member coupled thereto are disposed in said first position with said separable contacts being closed; and wherein said door latch is disposed in said unlocked position when said poleshaft and said drive coupler and said pivot member coupled thereto are disposed in said second position with said separable contacts being open.

5. The door interlock assembly of claim 4 wherein said mounting bracket includes a spring coupled between said mounting bracket and the second end of said pivot member; and wherein said spring biases said pivot member in order to facilitate movement of said door latch when the poleshaft of said electrical switching apparatus and said drive coupler and said pivot member coupled thereto move, thereby moving said drive rod and the second end of said door latch coupled thereto.

6. The door interlock assembly of claim 1 wherein said linkage interconnecting said pivot member and said door latch is a drive rod assembly comprising:
   a drive rod,
   first and second pivotal couplings pivotally connecting one end of said drive rod to the first end of said pivot member and the other end of said drive rod to the second end of said door latch, and
   an adjustable fastening mechanism including a plurality of fasteners for securing said drive rod to said pivot member and said door latch.

7. The door interlock assembly of claim 6 wherein said drive rod is a threaded rod; wherein said adjustable fastening mechanism further includes a spring adapted to bias said door latch toward the locked position; and wherein said plurality of fasteners includes a plurality of lock nuts which threadingly engage said threaded rod.

8. The door interlock assembly of claim 1 wherein said electrical switching apparatus is a draw-out circuit breaker; wherein said frame is a chassis including a draw-out mechanism; and wherein said draw-out mechanism is coupled between said chassis and said enclosure in order to permit said draw-out circuit breaker to be drawn into and out of said enclosure.

9. A door interlock assembly for an enclosure housing electrical switching apparatus, said enclosure including a frame having first and second sides for supporting said electrical switching apparatus and a door for controlling access to said electrical switching apparatus housed therein, said electrical switching apparatus including a pair of separable contacts and an operating mechanism for opening and closing said separable contacts, said operating mechanism including a poleshaft operable between first and second positions corresponding to said separable contacts being closed and opened, respectively, and a trip lever adapted to open said separable contacts when actuated, said door interlock assembly comprising:
   a pivot member structured to be coupled to said poleshaft in order to move therewith, said pivot member including a first end and a second end;

a mounting bracket structured to be coupled to one of said first and second sides of said frame, said mounting bracket having an opening receiving a portion of said pivot member therethrough;

a door latch structured to be pivotally coupled to said one of said first and second sides of said frame, said door latch including first and second ends, the first end of said door latch being adapted to engage and lock the door of said enclosure;

a linkage interconnecting said pivot member and said door latch; and means for tripping open said separable contacts when said door is open.

10. The door interlock assembly of claim 9 wherein said means for tripping open said separable contacts when said door is open comprises:

a mechanical sensor assembly comprising:

a trip lever engagement mechanism pivotally coupled to said mounting bracket and adapted to engage and actuate said trip lever, thereby opening said separable contacts when the door of said enclosure is open, a door sensor structured to engage said door, said door sensor having a first position wherein said door is open and a second position wherein said door is closed, and a shaft interconnecting said door sensor and said trip lever engagement mechanism in order that said trip lever engagement mechanism engages and actuates said trip lever, thereby opening said separable contacts when said door sensor is disposed in said first position and said door is open and said trip lever is disengaged.

11. The door interlock assembly of claim 10 wherein said pivot member is a first pivot member; wherein said trip lever engagement mechanism of said mechanical sensor assembly further includes a second pivot member pivotally coupled to said mounting bracket, a spring coupled between said second pivot member and said mounting bracket and a paddle member coupled to said second pivot member; wherein said spring is adapted to bias said second pivot member and said shaft and said door sensor coupled thereto against said door; and wherein movement of said biased second pivot member caused by opening and closing said door moves said paddle member coupled thereto, in order that said paddle member engages and activates said trip lever thereby opening said separable contacts when the door of said enclosure is opened.

12. The door interlock assembly of claim 10 wherein said linkage is a drive rod assembly comprising:

a threaded drive rod, first and second pivotal couplings for pivotally connecting one end of said threaded drive rod to the first end of said pivot member and the other end of said threaded drive rod to the second end of said door latch, and an adjustable fastening mechanism including a spring adapted to bias said door latch toward the locked position and a plurality of fasteners for securing said threaded drive rod to said pivot member and said door latch.

13. A draw-out circuit breaker assembly comprising:

a draw-out circuit breaker including a pair of separable contacts and an operating mechanism for opening and closing said separable contacts, said operating mechanism including a poleshaft, operable between first and second positions corresponding to said separable contacts being open and closed, respectively;

an enclosure housing said draw-out circuit breaker, said enclosure including a door for controlling access to said draw-out circuit breaker housed therein, a frame having first and second sides for supporting said circuit breaker and a draw-out mechanism coupled to said frame in order to permit said circuit breaker to be drawn into and out of said enclosure; and a door interlock assembly comprising:

a pivot member coupled to said poleshaft in order to move therewith, said pivot member including a first end and a second end, a mounting bracket coupled to one of said first and second sides of said frame, said mounting bracket having an opening receiving a portion of said pivot member therethrough, a door latch pivotally coupled to said one of said first and second sides of said frame, said door latch including first and second ends, the first end of said door latch being adapted to engage and lock the door of said enclosure, and a linkage interconnecting said pivot member and said door latch.

14. The draw-out circuit breaker assembly of claim 13 wherein said pivot member further includes a drive coupler coupled to said poleshaft, in order to move therewith; and wherein said pivot member is coupled to said drive coupler, in order that it moves with said drive coupler and said poleshaft.

15. The draw-out circuit breaker assembly of claim 14 wherein said door latch has locked and unlocked positions corresponding to said first and second positions, respectively, of said poleshaft and said drive coupler and said pivot member coupled thereto; wherein the first end of said door latch is adapted to engage and lock the door of said enclosure when said door latch is disposed in said locked position; and wherein the first end of said door latch is adapted to disengage and unlock the door of said enclosure when said door latch is pivoted from said locked position to said unlocked position.

16. The draw-out circuit breaker assembly of claim 15 wherein said linkage interconnecting said pivot member and said door latch includes a drive rod coupled at one end to the first end of said pivot member and at the other end to the second end of said door latch; wherein said door latch is disposed in said locked position when said poleshaft and said drive coupler and said pivot member coupled thereto are disposed in said first position with said separable contacts being closed; and wherein said door latch is disposed in said unlocked position when said poleshaft and said drive coupler and said pivot member coupled thereto are disposed in said second position with said separable contacts being open.

17. The draw-out circuit breaker assembly of claim 16 wherein said mounting bracket includes a spring coupled between said mounting bracket and the second end of said pivot member; and wherein said spring biases said pivot member in order to facilitate movement of said door latch when the poleshaft of said electrical switching apparatus and said drive coupler and said pivot member coupled thereto move, thereby moving said drive rod and the second end of said door latch coupled thereto.

18. The draw-out circuit breaker assembly of claim 13 wherein said draw-out circuit breaker further includes a trip lever adapted to open said separable contacts when actuated and a mechanical sensor assembly comprising:

a trip lever engagement mechanism pivotally coupled to said mounting bracket and structured to engage and actuate said trip lever thereby opening said separable contacts when the door of said enclosure is open, a door sensor engaging said door, said door sensor having a first position wherein said door is open and a second position wherein said door is closed, and a shaft interconnecting said door sensor and said trip lever engagement mechanism in order that said trip lever engagement mechanism engages and actuates said trip lever, thereby opening said separable contacts when said door sensor is disposed in said first position and said door is open and said trip lever is disengaged.

19. The draw-out circuit breaker assembly of claim 18 wherein said trip lever engagement mechanism of said mechanical sensor assembly further includes a second pivot member pivotally coupled to said mounting bracket, a spring coupled between said second pivot member and said mounting bracket and a paddle member coupled to said second pivot member; wherein said spring biases said second pivot member and said shaft and said door sensor coupled thereto against said door; and wherein movement of said biased second pivot member caused by opening and closing said door moves said paddle member coupled thereto, in order that said paddle member engages and activates said trip lever thereby opening and closing said separable contacts, respectively, when the door of said enclosure is opened and closed.

20. The draw-out circuit breaker assembly of claim 13 wherein said linkage interconnecting said pivot member and said door latch is a drive rod assembly comprising:

a drive rod, first and second pivotal couplings for pivotally connecting one end of said drive rod to the first end of said pivot member and the other end of said drive rod to the second end of said door latch, and an adjustable fastening mechanism including a plurality of fasteners for securing said drive rod to said pivot member and said door latch.

21. The draw-out circuit breaker assembly of claim 20 wherein said drive rod is a threaded rod; wherein said adjustable fastening mechanism further includes a spring adapted to bias said door latch toward the locked position; and wherein said plurality of fasteners includes a plurality of lock nuts which threadingly engage said threaded rod.

\* \* \* \* \*